United States Patent

Elizer

[15] 3,650,787
[45] Mar. 21, 1972

[54] AMPHOTERIC, HIGH AMYLOSE STARCHES AND PREPARATION AND USES THEREOF

[72] Inventor: Lee H. Elizer, Keokuk, Iowa
[73] Assignee: The Hubinger Company, Keokuk, Iowa
[22] Filed: Oct. 9, 1969
[21] Appl. No.: 866,125

Related U.S. Application Data

[63] Continuation of Ser. No. 691,179, Dec. 18, 1967, abandoned.

[52] U.S. Cl. ........... 106/213, 117/138.8 F, 117/139.5 C, 260/233.3
[51] Int. Cl. ........................................... C08b 25/02
[58] Field of Search ............... 260/233.3; 106/210; 117/139.5 C, 138.8 F

[56] References Cited

UNITED STATES PATENTS

| | | | |
|---|---|---|---|
| 2,813,093 | 11/1957 | Caldwell et al. | 260/233.3 |
| 3,046,272 | 7/1962 | Strating et al. | 106/210 |
| 3,051,700 | 8/1962 | Elizer et al. | 106/233.3 |
| 3,352,848 | 11/1967 | Christoffel et al. | 260/233.3 X |
| 3,459,632 | 8/1969 | Caldwell et al. | 260/233.3 X |
| 3,467,647 | 9/1969 | Benninga | 106/210 X |

*Primary Examiner*—Theodore Morris
*Attorney*—Johnston, Root, O'Keeffe, Keil, Thompson & Shurtleff

[57] ABSTRACT

Amphoteric, high amylose starch containing both basic and acidic groups, preferably tertiary amino and sulfonic acid or sulfonate groups, in the starch molecule, which amphoteric starches are especially useful for sizing threads or yarns of mixed fibers, such as cotton fibers and polyester fibers, viz, polyethylene terephthalate fibers.

28 Claims, No Drawings

AMPHOTERIC, HIGH AMYLOSE STARCHES AND PREPARATION AND USES THEREOF

This application is a continuation of Ser. No. 691,179, filed Oct. 9, 1969, and now abandoned.

BACKGROUND OF THE INVENTION

Starches in general are composed of two different types of polysaccharides, amylose and amylopectin. Both are composed of D-glucopyranose. Amylose is a linear molecule, whereas amylopectin has a branch chain molecular structure.

Formation of smooth gels of high amylose content starches, i.e., containing about 50 percent or more amylose, requires autoclaving under pressure. The inconvenience and costs occasioned thereby often makes the use of such starches economically unfeasible. Furthermore, the starch pastes, after gelatinization under pressure, tend to be unstable because of the tendency of the high amylose starch to separate from the water of gelation.

It is well known that starches are useful in sizing cotton fibers and for a wide variety of other industrial purposes. In recent years, many synthetic fibers have become available, and it has been difficult to find relatively inexpensive sizing compositions which are suitable for sizing a wide variety of these fibers, including mixtures of cotton and synthetic fibers. In particular, it has been difficult to provide suitable low cost sizing compositions for mixtures of polyester fibers and cotton. In common practice, the fibers are sized in the form of threads or yarns prior to weaving. The sized threads or yarns are then woven into cloth and thereafter the sizing material is removed by washing with water containing detergent or by treatment with enzymes. A satisfactory sizing composition is one which will provide suitable lubrication and resistance during weaving and at the same time can be readily removed thereafter.

The present invention is concerned with the modification of high amylose starches by chemically combining said starches through oxygen atoms of the polysaccharide molecules with both basic and acidic groups, or substituents which render the high amylose starches amphoteric. The added groups or substituents provide a high amylose starch composition both anionic and cationic groups. These new and improved high amylose starch products are prepared by reacting an ungelatinized, high amylose starch containing about 50 percent or more amylose with a nitrogen containing etherifying agent and also with a sultone. The preferred etherifying agent is a dialkylchloroalkyl tertiary amine in the form of its hydrochloride salt such as 2-chloroethyldiethylamine hydrochloride, and the preferred sultone is propane sultone or butane sultone.

The 2-chloroethyldiethylamine hydrochloride has the formula:

I.

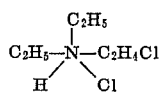

This can also be written: $(C_2H_5)_2NCH_2CH_2Cl \cdot HCl$.
Propane sultone has the formula:

II.

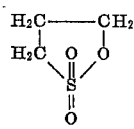

The reaction with the ungelatinized starch can be carried out either sequentially or simultaneously. Thus, the 2-chloroethyldiethylamine hydrochloride can be reacted with the starch first, followed by the addition of the propane sultone, or the propane sultone can be reacted with the starch, followed by the addition of the 2-chloroethyldiethylamine hydrochloride, or the 2-chloroethyldiethylamine hydrochloride and the propane sultone can be mixed together in water to form a clear solution before stirring the mixture with a starch slurry.

The basic amino groups are preferably introduced into the starch molecule by using as one of the reactants a tertiary amine or tertiary amine salt containing a reactive group linked to a hydrocarbon or hydroxy hydrocarbon group of the amine. The hydrocarbon group or groups of the amine can be alkyl (e.g., methyl, ethyl, propyl, isopropyl, butyl, isobutyl), aryl (e.g., phenyl, tolyl), aralkyl (e.g., benzyl), or cycloaliphatic (e.g., cyclopentyl, cyclohexyl, or cycloheptyl). The amine can be a monoamine or a polyamine but is preferably a monoamine. It can also be a heterocyclic amine (e.g., piperidine, pyridine). In general, however, from the standpoint of ease of carrying out the reaction and of desirable properties in the resultant products, it is preferred to use a water soluble amine or amine salt. The reactive groups of the amine are halogen (e.g., chloro-, bromo-, etc.) or epoxy. The portion of the amine to which the reactive group is attached is acyclic.

The resultant products may be described by the following structural formula:

III.

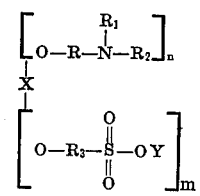

where X is starch, R is alkylene, preferably having two to six carbon atoms and more specifically two or three carbon atoms, $R_1$ and $R_2$ are hydrocarbon, preferably alkyl having one to six carbon atoms and more specifically one to four carbon atoms, $R_3$ is alkylene which can be hydrocarbon substituted, preferably having three or four carbon atoms, Y is hydrogen or a salt forming radical, e.g., sodium, potassium, calcium, ammonium, and $n$ and $m$ are numerical values representing the number of times the basic and acidic radicals respectively occur in the molecule.

The starch molecule is usually considered to consist of a number of anhydroglucose units (AGU) each having a molecular weight of 162.14. Each AGU has three reactive hydroxyls but one of these reacts more readily than the others. Hence, one simple type of molecule of a typical amphoteric starch of the invention can be represented by the following structure:

IV.

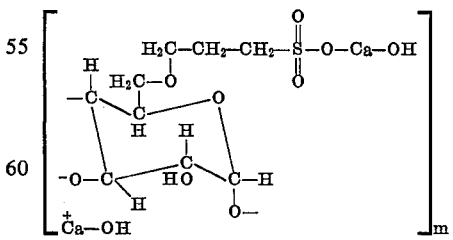

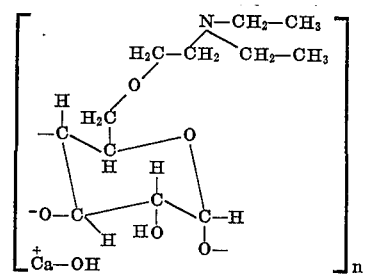

The term "high amylose starch" when used herein refers to any starch or starch fraction containing at least about 50 percent by weight amylose. Exemplary thereof are "Nepol" amylose (the amylose fraction of corn starch); "Superlose" (the amylose fraction of potato starch); "Amylomaize" or Amylon" (high amylosic corn starch with about 54 percent amylose); and Amylomaize VII (high amylose corn starch containing about 73.3 percent amylose). Amylomaize VIII with an amylose content of around 85 percent can also be used. The starch can be of any origin, for example, corn, wheat, potato, waxy corn, tapioca, sago or rice.

Sultones are intramolecular cyclic esters of hydroxysulfonic acids and may be derived both from aliphatic and from aromatic sulfonic acids. Examples of sultones suitable for the present purpose are 1,3-propanesultone, 1,4-butanesultone, mixtures of isomeric butanesultones (which may be prepared from mixtures of chlorobutanesulfonic acids, obtained by sulfochlorination of 1-chlorobutane), benzylsultone and tolylsultone.

Examples of amine etherifying agents suitable for the practice of the invention are: 2-chlorotriethylamine; 2-chlorotriethylamine hydrochloride; 2-chloroethyldimethylamine; 2-chloroethyldimethylamine hydrochloride; 3-chloropropyldiethylamine; 3-chloropropyldiethylamine hydrochloride; 3-chloropropyldimethylamine; 3-chloropropyldimethylamine hydrochloride; 4-chlorobutyldiethylamine; 4-chlorobutyldiethylamine hydrochloride; 2-hydroxy-2-chloroisopropyldimethylamine; 3-dibutylamino-1,2-epoxypropane; 2-bromo-5-diethylaminopentane hydrobromide, N-(2,3-epoxypropyl) piperidine; N,N-(2,3-epoxypropyl)methyl aniline. In general, it is preferable to use the salts of the amine etherifying agents, such as, for example, the hydrochlorides and the hydrobromides. Mixtures of amine etherifying agents can be employed. The salts should be selected so as to avoid formation of precipitates. For example, if calcium, strontium or barium is present, sulfates or phosphates should not be used because insoluble salts, such as calcium sulfate or calcium phosphate, would form. However, sulfates or phosphates can be used where sodium potassium or lithium ions are present.

The sultone and the tertiary amino compound both act as etherifying agents for starch under basic conditions. The reaction can be carried out at ordinary or slightly elevated temperatures below the temperature at which the starch gelatinizes, for example, within the range of 35° to 120° F. In order to obtain uniform reaction, it is desirable to mix the reactants with a solvent, preferably water. Other solvents, for example, acetone, can be used but they are more expensive and in some cases present problems in recovering the product. The product is insoluble in water and therefore can be recovered by filtration, washing with water and drying.

The invention will be further illustrated but is not limited by the following examples in which the quantities are stated in parts by weight unless otherwise indicated.

EXAMPLE I a. A slurry of 5,000 grams of ungelatinized amylomaize VII in 7 liters of water was prepared. The resultant slurry was diluted to a volume of 12 liters. The amylomaize VII has an amylose content of 73.3 percent.

b. The resultant slurry described above was divided into five equal parts. To one part thereof 1.3 moles (96.2 grams) of calcium hydroxide in 250 cc water was added. To the resultant slurry was added 0.6 mole of 2-chloroethyldiethylamine hydrochloride (103.2 grams) in 100 cc water, and, after mixing, 0.6 mole of propane sultone (73.2 grams) in 50 cc. acetone was stirred in. All of the preceding operations were conducted at ambient temperature (about 90° F.).

After 21 hours, the pH of the slurry was adjusted to 7.0 with 6 N hydrochloric acid. The resultant product was filtered and reslurried in 2 liters of water. The latter slurry was filtered and reslurried in 2 liters of water, filtered again, reslurried in 1 liter of water, filtered again and dried.

EXAMPLE II

Another part of said amylomaize VII slurry from Example I(a) was combined with 0.5 mole of 2-chloroethyldiethylamine hydrochloride (86.0 grams) in 100 cc. water. After stirring, 0.5 mole of propane sultone (61.0 grams) dissolved in 50 cc. of acetone was stirred into the resultant slurry. Thereafter 0.5 mole of calcium hydroxide (37.0 grams) in 100 cc. water was stirred into the slurry. After 18 hours the resultant slurry was filtered and reslurried as described in Example I.

The amphoteric high amylose starches of Examples I and II were found to have the following compositions and properties:

|  | Example I | Example II |
|---|---|---|
| moisture-free solids, % | 92.4 | 96.3 |
| Percent ash, dry basis | 1.64 | 0.79 |
| Percent nitrogen, dry basis | 0.70 | 0.39 |
| N's/100 AGU | 8.0 | 4.5 |
| Percent sulfur, dry basis | 0.97 | 0.60 |
| S's/100 AGU | 4.8 | 3.0 |
| Reaction efficiency, N | 79.0% | 55.7% |
| Reaction efficiency, S | 50.4% | 37.5% |
| Isoelectric pH | 8.0 | 4.5 |

It should be noted from the foregoing examples that an alkaline reaction mixture increases the reaction efficiency. Furthermore, in other tests conducted wherein potassium hydroxide and sodium hydroxide were substituted for the calcium hydroxide and added after the addition of the tertiary amine hydrochloride or after addition of both reactants, the starch gelatinized during the reaction.

The starch of Example I gelatinized as a smooth paste substantially free from ungelatinized starch granules when cooked in boiling water, whereas the starch of Example II formed a paste with many gelatinized starch granules after a 35 minute cook on a boiling water bath.

Additional physical properties of these starches are:

|  | Example I | Example II |
|---|---|---|
| NCV: 0.3 AGU | 52.6/50/25 | 50.5/50/(a) |
| 0.2 AGU | 25.1/50/11 | 33.6/50/15(b) |
| pH paste | 7.6 | 4.9 |
| Cold paste | fluid | fluid | a. too viscous to measure
b. only partial gelatinization

The NCV determinations are viscosity determinations of starch compositions prepared by slurrying 50 grams of the respective starches in 400 cc. of water, stirring, and heating at about 212° F. for 30 minutes. The first entry is grams of respective starch product required to give the 0.3 or 0.2 AGU. The second entry indicates the volume in cc. of the starch composition used in the viscosity determination, while the third entry is the time in seconds for flow of the stated volume (50 cc.) in the viscosity measurement.

EXAMPLE III

A slurry of amylomaize VII was prepared as described in Example I(a) and divided into five equal parts, each containing 6.16 AGU or 1,000 grams high amylose starch on a dry basis.

a. To the first part, labeled 30.1, a slurry of 28 grams of calcium oxide (0.5 mole CaO) in 100 cc of water was added and stirred with the high amylose starch slurry at a temperature of 88° F. To the resultant slurry was added 0.2 mole of 2-chloroethyldiethylamine hydrochloride (34.4 grams) in 100 cc. of water, and, after mixing, 0.2 mole of propane sultone (24.4 grams) was dripped directly into the slurry. These operations were conducted at about a temperature of 86°–88° F.

After 16 hours, at this temperature the pH of the slurry was adjusted to 6.5 with 6 N hydrochloric acid and the product was processed as described in Example I.

b. The same procedure was carried out as in (a) of this example except that 0.7 mole of CaO (39.2 grams) in 175 cc. of water, 0.3 mole of 2-chloroethyldiethylamine hydrochloride (51.6 grams), and 0.3 mole of propane sultone (36.6 grams) were used. After 16 hours the pH was adjusted to pH of 7 with 6 N hydrochloric acid and recovered in the manner previously described. This product was labeled 30.2.

c. The process was carried out as in (a) above except that 0.9 mole of CaO (50.4 grams) in 200 cc of water, 0.4 mole of 2-chloroethyldiethylamine hydrochloride (68.8 grams) and 0.4 mole of propane sultone (48.8 grams) were used. After 16 hours the pH was adjusted to pH of 8 with 6 N hydrochloric acid and the product was recovered in the manner previously described. This product was labeled 30.3.

d. The procedure was the same as in (a) except that 1.1 mole CaO (61.6 grams) in 225 cc of water, 0.5 mole of 2-chloroethyldiethylamine hydrochloride (86 grams), and 0.5 mole propane sultone (61 grams) were used. The pH was adjusted to pH of 8 with 6 N hydrochloric acid and the product recovered as previously described. This product was labeled 30.4.

e. The procedure was the same as in (a) except that 1.3 moles CaO (72.8 grams) in 250 cc. water, 0.6 mole of 2-chloroethyldiethylamine hydrochloride (103.2 grams) and 0.6 mole of propane sultone (73.2 grams) were used. The pH was adjusted with 6 N hydrochloric acid with 6 N hydrochloric acid to pH of 8 and the following characteristics of the product were determined:

| | 30.1 | 30.2 | 30.3 | 30.4 | 30.5 |
|---|---|---|---|---|---|
| Moisture free solids, percent | 85.5 | 87.1 | 90.6 | 85.7 | 87.2 |
| Percent ash, dry basis | 0.64 | 0.22 | 0.56 | 0.89 | 1.30 |
| Percent nitrogen, dry basis | 0.34 | 0.45 | 0.55 | 0.65 | 0.74 |
| N's/100 AGU | 4.1 | 5.4 | 6.4 | 7.5 | 8.6 |
| Percent sulfur, dry basis | 0.16 | 0.22 | 0.25 | 0.28 | 0.34 |
| S's/100 AGU | 1.4 | 1.8 | 2.1 | 2.3 | 2.9 |
| NCV (25 grams dry basis/400 cc. water cooked 30 minutes) | 7.0 | 8.2 | 8.2 | 7.6 | 7.6 |
| pH paste | 7.0 | 7.2 | 7.7 | 7.6 | 7.6 |
| Cold paste | Fluid | Fluid | Fluid | Fluid | Fluid |

It was also observed that the gelatinization temperature decreased with an increase in substitution of acidic and basic groups. Thus, the product 30.1 had a gelatinization temperature of 59°–63° C. with a total substitution of 5.5 basic and acidic groups (4.1 + 1.4), and the product 30.5 had a gelatinization temperature of 55°–59° C. with a total substitution of 11.5 basic and acidic groups (8.6 + 2.9). The intermediate products all had higher gelatinization temperatures than the product 30.5. Conductivity measurements on a gelatinized product containing 0.2 AGU in 400 cc. of water, cooked 30 minutes and measured at 45° C. gave 159.5 micromhos for product 30.1; 172.5 mmhos for product 30.2; 250 mmhos for product 30.3; 313 mmhos for product 30.4 and 470 mmhos for product 30.5.

The products prepared as previously described were used at their isoelectric point. At this point they contain no charge. However, they can be prepared by separating them without neutralizing with hydrochloric acid or other acidic substance, thereby giving a product having a pH in the range of 10 to 11 due to the fact that calcium oxide or hydroxide was present during its preparation. Such a product has a negative charge and is anionic. Hence, it will attract substances which are positively charged, such as basic dyes, cationic melamine-formaldehyde resins, and other cationic resins.

The products can also be prepared so as to have a pH below the isoelectric pH. This can be done, for example, by adding hydrochloric acid until the pH is around 1 and then raising it to about 4 with NaOH or other alkaline substance and separating the resultant product. The product in this case is cationic and when employed in a coating composition, will have an affinity for negatively charged substances, such as acid dyes, acidic resins, e.g., polyester resins, and other acidic resins.

A simple method for determining whether the product is neutral, anionic or cationic is to test an ungelantinized slurry of the product with methylene blue basic dye (Color Index No. 52015) and light green SF yellowish acid dye (Color Index 42095). The cationic products will accept the acid dye, the anionic products will accept the basic dye and no dyeing occurs with either product at the isoelectric point.

In Example III, only the product 30.5 was completely gelatinizable. The others were partially gelatinizable. For most users, the product should be completely gelatinizable when a slurry in water is heated at atmospheric pressure to boiling and the amount of substitution of basic and acidic groups should be effective for this purpose. The amount of substitution will vary with the amylose content. While the amylose content should be at least 50 percent by weight, a preferred range is 70 to 85 percent.

The proportions of tertiary amine etherifying agent and sultone used in the process are subject to variation but are preferably in a molar ratio within the range of 1:3 to 3:1, usually around 1:1. An excess of either reactant can be present. As the examples show, the basic groups and acidic groups do not necessarily react with the starch in the proportions in which they are used in the process.

From the examples it will be seen that ungelatinized granular amphoteric high amylose starch containing 8 or more basic nitrogen atoms (basic groups) per 100 AGU units, and 2.9 or more sulfonic acid or sulfonate units (acidic groups) per 100 AGU units provides a starch composition which will form with water upon boiling at atmospheric pressure a gelatinized paste substantially free from ungelatinized starch granules. The number of basic groups normally exceeds the number of acidic groups, the ratio of basic groups to acidic groups preferably being at least 1.5:1, and a preferred range being 1.75:1 to 3:1.

SIZING OF TEXTILE FIBERS

In the sizing of textile fibers a typical sizing composition can be prepared by mixing 100 pounds of an amphoteric starch prepared in accordance with this invention with 100 gallons of water, preferably with the addition of five pounds of petroleum wax, and then heating to the gelatinization temperature. The thread or yarn to be sized, for example, a thread or yarn containing 65 percent polyester fiber (polyethylene glycol terephthalate), and 35 percent cotton fibers, is then sized by passing it through this composition.

In using this sizing composition, the number of yards of woven material between changes of loom stops can be increased. After weaving, the sizing material can be removed by treatment with enzymes in the usual manner or by washing with a detergent water.

The compositions of the invention can also be employed in other uses, for example, in the finishing of textiles, in dyeing textiles and paper, in the sizing of paper, in the application of pigments or coatings to cloth and paper, in coating polyolefins, as a coagulating agent in the separation of finely divided mineral particles from ores or water, in sedimentation, and for a wide variety of other purposes.

The pastes of the gelatinized starch product of Example I sized 65 percent polyethylene glycol terephthalate, 35 percent combed cotton yarn very well. Other natural fiber and/or synthetic polymer yarns which may be sized with the amphoteric high amylose starches herein described are nylon yarns, polyester yarns, polyacrylonitrile, rayons, and yarns of other synthetic fibers or blends thereof with natural fibers, such as cotton, wool, etc.

It is advantageous, in accordance with the invention, to provide in the starch slurry prior to addition of the sultone as the etherifying agent, an alkaline earth metal base, such as calcium hydroxide, barium hydroxide or strontium hydroxide. The temperature for reaction of the sultone and the clarifying agent is, in general, room or ambient temperature or temperatures slightly above or below, i.e., a temperature range of about 60° to 120° F. Where the alkaline earth metal base is employed, the resultant sulfonic acid groups on the sultone will be in whole or in part the alkaline earth metal sulfonate.

I claim:

1. An ungelatinized granular amphoteric high amylose starch product having an amylose content of at least 50 percent by weight and bearing both cationic tertiary amine or tertiary amine salt groups, and anionic sulfonic acid or sulfonate groups connected to the starch molecules through carbon and oxygen, the number of said cationic and anionic groups being sufficient to make said starch product amphoteric and sufficient to render such starch product gelatinizable on heating in water at the boiling point under atmospheric pressure to give a gelatinized paste substantially free from ungelatinized granules.

2. A starch product as claimed in claim 1 in which the amylose content is within the range of 50 to 85 percent by weight.

3. A starch product as claimed in claim 1 in which the ration of cationic groups to anionic groups is at least 1.5:1.

4. A starch product as claimed in claim 1 bearing on separate places in the starch molecule
   a. a cationic substituent which does not contain a hydrocarbon group having more than seven atoms and which carries a cationic tertiary amine or a cationic tertiary amine salt group, and
   b. an anionic substituent which does not contain a hydrocarbon group having more than seven carbon atoms and which carries an anionic sulfonic acid or anionic sulfonate group, which product has an isoelectric point in a pH range above about 4.5.

5. A starch product as claimed in claim 4 in which the isoelectric point is within a pH range between about 4.5 and about 8.

6. An ungelatinized granular amphoteric high amylose starch product having the formula

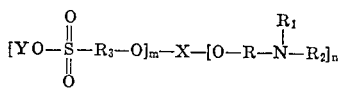

where X is starch containing 50 to 85 percent by weight amylose, R and $R_3$ are alkylene containing two to six carbon atoms, $R_1$ and $R_2$ are hydrocarbon containing one to six carbon atoms, Y is hydrogen or a salt forming group, and $n$ and $m$ are numerical values sufficient to make said starch product amphoteric and sufficient to render said starch gelatinizable on heating in water at the boiling point under atmospheric pressure to give a gelatinized paste substantially free from ungelatinized granules.

7. A starch product as claimed in claim 6 in which the ratio of $n:m$ is within the range of 1.5:1 to 3:1.

8. A starch as claimed in claim 1 wherein said sulfonic acid and said sulfonate contain a radical of the formula $-R_4-SO_3X$ wherein $R_4$ is alkylene of 3-4 carbons and X is hydrogen or a sodium, potassium, calcium or ammonium salt forming group.

9. A starch as claimed in claim 1 wherein said amine groups contain a radical of the formula

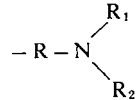

wherein R is alkylene of 2–6 carbons, and $R_1$ and $R_2$ are alkyl of 1–6 carbons.

10. A starch as claimed in claim 1 wherein said cationic groups are ethylene diethylamine groups connected through carbon of the ethylene group and oxygen to the starch molecule and said anionic groups are $-R_4-SO_3X$ wherein $R_4$ is alkylene of 3–4 carbon atoms connected through oxygen to the starch molecule, and X is hydrogen or a sodium, potassium, calcium or ammonium salt forming group.

11. A starch composition comprising a starch as claimed in claim 1 in which the pH has been adjusted to the isoelectric pH.

12. A starch composition comprising a starch as claimed in claim 1 in which the pH has been adjusted to a point above the isoelectric pH.

13. A starch composition comprising a starch as claimed in claim 1 in which the pH has been adjusted to a point below the isoelectric pH.

14. A product as claimed in claim 1 containing a total of at least 11.5 cationic and anionic groups per 100 AGU and at least 1.5 cationic groups per anionic group.

15. A product as claimed in claim 1 in which there are at least 8 cationic groups per 100 AGU.

16. A product as claimed in claim 1 in which there are at least 2.9 anionic groups per 100 AGU.

17. A product as claimed in claim 1 in which the ratio of cationic groups to anionic groups is within the range of 1.75:1 to 3:1.

18. A process for preparing an amphoteric high amylose starch which comprises reacting an ungelatinized, high amylose starch containing at least 50 percent amylose in an alkaline aqueous slurry thereof under non-gelatinizing conditions with a tertiary amine etherifying agent and a sultone, the molar ratio of said amine etherifying agent and said sultone being within the range of 3:1 to 1:3 and the reaction being carried out until a starch having an isoelectric point is obtained.

19. A process as claimed in claim 18, and recovering the resultant amphoteric starch as an ungelatinized granular product in which the granular structure thereof is retained.

20. A process as claimed in claim 18 wherein said slurry contains calcium oxide.

21. A process as claimed in claim 18 wherein said etherifying agent is a dialkyl chloroalkyl tertiary amine and said sultone is propane sultone.

22. A process as claimed in claim 18 wherein after said reaction the pH is adjusted to the isoelectric pH and the product is recovered.

23. A process as claimed in claim 18 wherein the product is recovered at a pH above the isoelectric pH.

24. A process as claimed in claim 18 wherein the product is recovered at a pH below the isoelectric pH.

25. A process for sizing textile fibers prior to fabrication thereof into textiles which comprises coating said fibers with a gelatinized aqueous dispersion of a high amylose amphoteric starch as claimed in claim 1 wherein the pH is the isoelectric pH.

26. A process as claimed in claim 25 in which said textile fibers comprise a mixture of polyester fibers and cotton.

27. A process for sizing textile fibers prior to fabrication thereof into textiles which comprises coating said fibers with a gelatinized aqueous dispersion of a high amylose amphoteric starch as claimed in claim 1 wherein the pH is above the isoelectric pH.

28. A process for sizing textile fibers prior to fabrication thereof into textiles which comprises coating said fibers with a gelatinized, aqueous dispersion of a high amylose amphoteric starch as claimed in claim 1 wherein the pH is below the isoelectric pH.

* * * * *

PO-1050
(5/69)

UNITED STATES PATENT OFFICE
CERTIFICATE OF CORRECTION

Patent No. 3,650,787          Dated March 21, 1972

Inventor(s) Lee H. Elizer

It is certified that error appears in the above-identified patent and that said Letters Patent are hereby corrected as shown below:

Column 3, line 27, "2-hydroxy-2-" should read -- 2- --.

Signed and sealed this 22nd day of August 1972.

(SEAL)
Attest:

EDWARD M. FLETCHER, JR.
Attesting Officer

ROBERT GOTTSCHALK
Commissioner of Patents